United States Patent [19]

Pallett et al.

[11] Patent Number: 5,666,918

[45] Date of Patent: Sep. 16, 1997

[54] ENGINE AIRFLOW CONTROLLER WITH FEEDBACK LOOP COMPENSATION FOR CHANGES IN ENGINE OPERATING CONDITIONS

[75] Inventors: Tobias J. Pallett, Ypsilanti; Bradley J. Hieb, Dearborn; Jerry D. Robichaux, Lincoln Park, all of Mich.

[73] Assignee: Ford Motor Company, Dearborn, Mich.

[21] Appl. No.: 570,032

[22] Filed: Dec. 11, 1995

[51] Int. Cl.$^6$ ............................. F02D 41/14; F02D 41/18
[52] U.S. Cl. ................................................ 123/350
[58] Field of Search ..................... 123/350, 339.19, 123/339.2, 339.21, 339.22, 361, 403

[56] References Cited

U.S. PATENT DOCUMENTS

| | | | |
|---|---|---|---|
| 4,881,502 | 11/1989 | Kabasin | 123/399 |
| 5,078,109 | 1/1992 | Yoshida et al. | 123/350 |
| 5,282,449 | 2/1994 | Takahashi et al. | 123/350 |

*Primary Examiner*—Andrew M. Dolinar
*Attorney, Agent, or Firm*—Peter Abolins; Roger L. May

[57] ABSTRACT

An Electronic Engine Controller (EEC) controls the operation of an electronically controlled throttle. The EEC generates a predicted desired throttle angle value as a function of upstream and downstream air pressure values, an air temperature value and a desired airflow value. A predicted actual throttle angle value is generated as a function of the upstream and downstream air pressure values, an air temperature value and an actual airflow value. A throttle angle difference value is generated as a function of the difference between the predicted desired throttle angle value and the predicted actual throttle angle value. A PID controller is employed to generate a throttle angle change value. The throttle angle change value is then added to the predicted desired throttle angle change value to generate a throttle angle control value, indicative of a position for said throttle. The throttle angle is then altered to a position corresponding to the throttle angle control value.

11 Claims, 3 Drawing Sheets

ENGINE AIRFLOW CONTROLLER WITH FEEDBACK LOOP COMPENSATION FOR CHANGES IN ENGINE OPERATING CONDITIONS

FIELD OF THE INVENTION

This invention relates generally to the field of engine controls and more particularly to controlling the rate of airflow in an engine.

BACKGROUND OF THE INVENTION

The use of an electronically controlled throttle to control airflow in a vehicle engine is often desirable because the throttle is no longer linked via a cable to the accellerator pedal and thus the system is no longer limited by the driver's positioning of the throttle. A typical mechanism for correcting an electronic throttle position command is to use a feedback type controller which varies the throttle position command in accordance with feedback gain chosen to optimize control of the system's response.

The feedback gain is generally empirically determined as a result of testing over a variety of engine operating conditions. Because the airflow rate across a throttle plate is non-linear with respect to certain engine operating conditions, a plurality of gains, for different engine operating ranges, is sometimes used to improve performance. Determination of the proper values for the plurality of gains however often requires extensive calibration efforts.

SUMMARY OF THE INVENTION

It is an object of the present invention to control the airflow rate into an engine over the entire operating range of the engine while avoiding the extensive calibration efforts required with a plurality of feedback gains.

In a first aspect of the invention, airflow past a throttle plate, positioned in an intake of an engine is controlled by generating an actual predicted throttle plate value indicative of a first predicted position of the throttle plate as a function of an actual airflow value, indicative of the mass flow rate of air into the intake, and as a function of a set of air intake values, indicative of a plurality of air intake characteristics. A desired predicted throttle plate value indicative of a second predicted position of the throttle plate is also generated, as a function of a desired airflow value, indicative of a desired mass flow rate of air into the intake, and as a function of the set of air intake values. A controller, which is responsive to the difference between the actual predicted throttle plate value and to the desired predicted throttle plate value generates a throttle position change value. A means, which is responsive to the difference and to the desired predicted throttle plate value generates a throttle angle control value indicative of a position of the throttle plate. The position of the throttle is then changed to a position corresponding to the throttle angle control value.

An advantage of certain preferred embodiments is that the rate of air mass flow into an engine is controlled without the need for a plurality of feedback gains, for particular engine operating ranges, which require extensive calibration efforts.

These and other features and advantages of the present invention may be better understood by considering the following detailed description of a preferred embodiment of the invention. In the course of this description, reference will frequently be made to the attached drawings.

DETAILED DESCRIPTION

Figure 1:
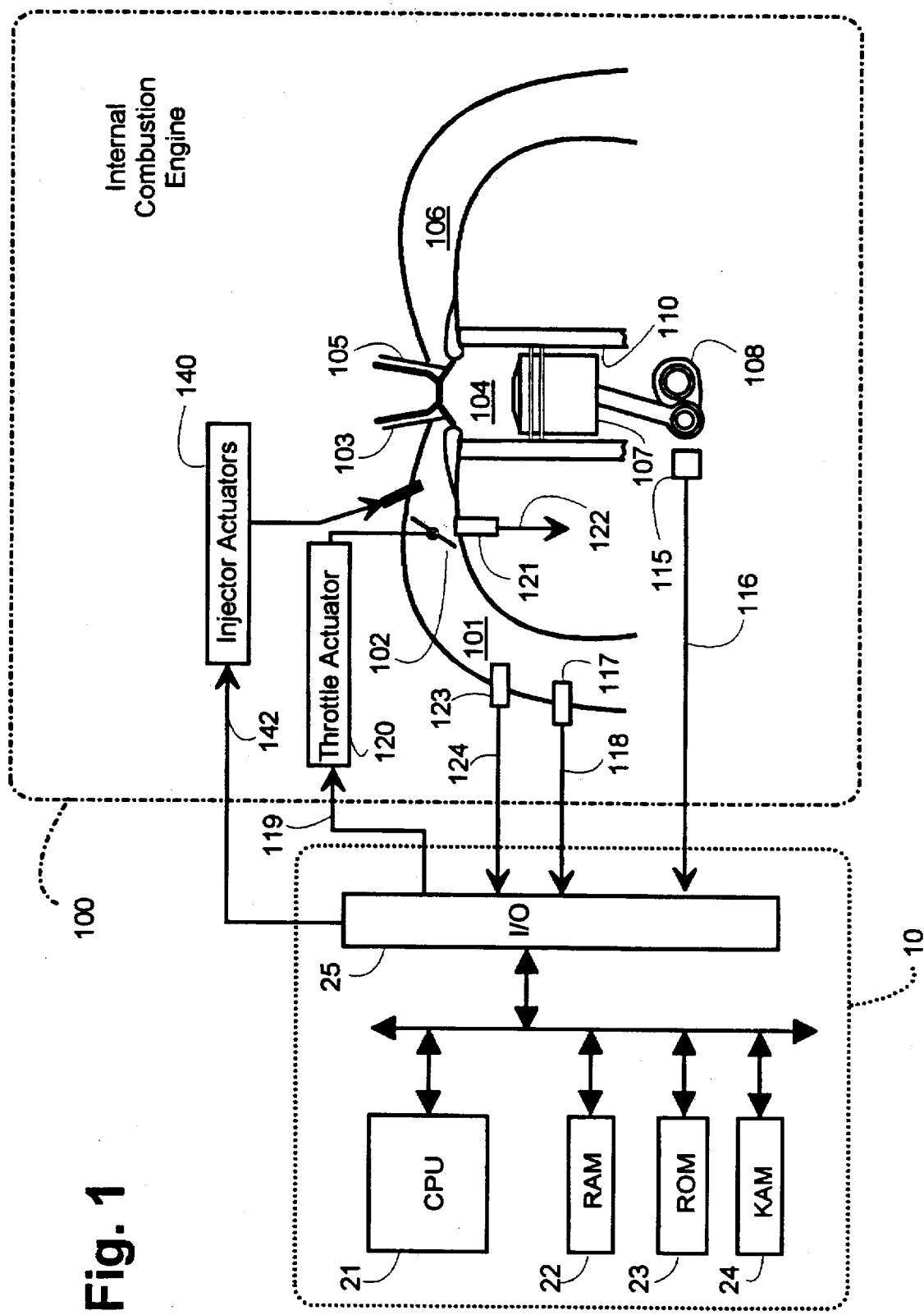
FIG. 1 of the drawings is a schematic illustration of an engine and engine controller which utilize the principles of the invention.

FIG. 1 of the drawings shows an Electronic Engine Controller (EEC) 10 and an internal combustion engine 100. Engine 100 draws an aircharge through an intake manifold 101, past a throttle plate 102, an intake valve 103 and into combustion chamber 104. An air/fuel mixture which consists of the aircharge and fuel, is ignited in combustion chamber 104, and exhaust gas produced from combustion of the air/fuel mixture is transported past exhaust valve 105 through exhaust manifold 106. A piston 107 is coupled to a crankshaft 108, and moves in a reciprocating fashion within a cylinder defined by cylinder walls 110.

A crankshaft position sensor 115 detects the rotation of crankshaft 108 and transmits a crankshaft position signal 116 to EEC 10. Crankshaft position signal 116 preferably takes the form of a series of pulses, each pulse being caused by the rotation of a predetermined point on the crankshaft past sensor 115. The frequency of pulses on the crankshaft position signal 116 are thus indicative of the rotational speed of the engine crankshaft. A Mass AirFlow (MAF) sensor 117 detects the mass flow rate of air into intake manifold 101 and transmits a representative air meter signal 118 to EEC 10. MAF sensor 117 preferably takes the form of a hot wire air meter. An air temperature sensor 123 generates an air temperature signal 124 which is indicative of the temperature of air entering intake 101. Injector actuators 140 operate in response to fuel injector signal 142 to deliver an mount of fuel determined by fuel injector signal 142 to combustion chambers 104 of the engine. Throttle 102 is electronically controlled and operates in response to throttle control signal 119 generated by EEC 10. Throttle actuator 120 receives throttle control signal 119 and causes movement of throttle 102 in accordance with throttle control signal 119.

EEC 10 includes a central processing unit (CPU) 21 for executing stored control programs, a random-access memory (RAM) 22 for temporary data storage, a read-only memory (ROM) 23 for storing the control programs, a keep-alive-memory (KAM) 24 for storing learned values, a conventional data bus, and I/O ports 25 for transmitting and receiving signals to and from the engine 100 and other systems in the vehicle.

Figure 2:
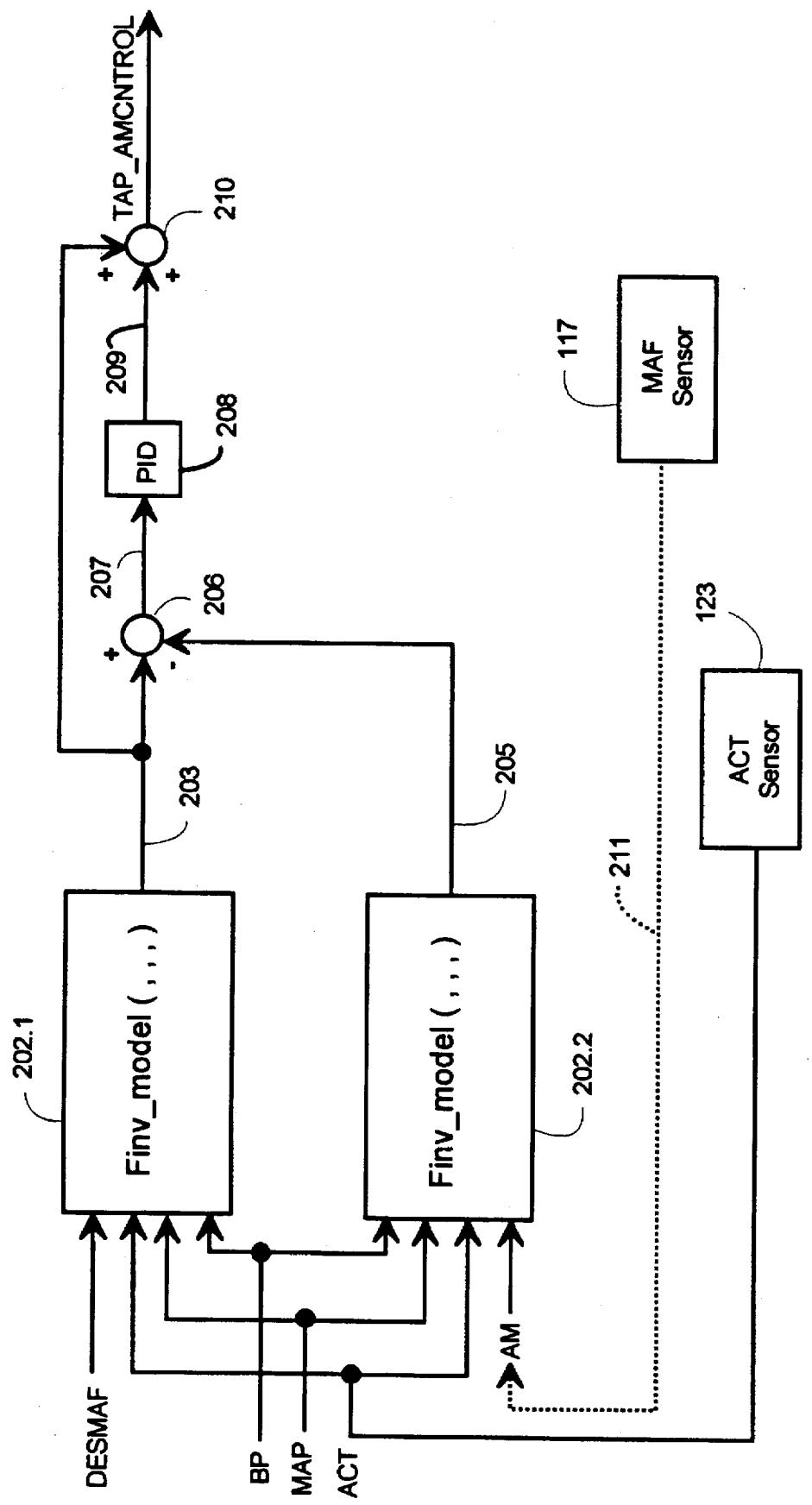
FIG. 2 is a block diagram illustrating the operation of a preferred embodiment.

A preferred embodiment of EEC 10 advantageously generates throttle control signal 119 in a manner which controls the position of throttle 102 to control the airflow rate into the engine over a variety of engine operating conditions. FIG. 2 of the drawings is a block diagram showing the operation of a preferred embodiment which is implemented as a stored program executed by the CPU 21. The functions shown in FIG. 2 are preferably executed under a range of different engine operating conditions. As seen, the module shown in FIG. 2 includes an indirect feedback loop in which the actual air mass flow rate, detected by sensor 117 is fed back to the module in the form of the value AM which is indicative of the actual air mass flow rate past the throttle 102. In FIG. 2, two throttle position values, TADES_pred and TAACT_pred (203 and 205, respectively), are developed in response to a plurality of engine operating conditions. The value TADES_pred is indicative of a throttle angle required to generate a desired airflow rate past the throttle. The value TAACT_pred is indicative of a throttle angle corresponding to the actual airflow past the throttle. At 206, throttle angle difference value, TAP_error, which is indicative of the difference between TADES_pred and TAACT_pred, is determined. At 208 a Proportional-Integral-Differential (PID) controller generates a throttle angle change value, DELTA_TA, which is indicative of an amount by which the throttle angle is to be changed. Other types of feedback controllers such as state feedback controllers may be employed in place of the PID controller. At 210, TADES_pred is added to DELTA_TA to generate a throttle angle control value, TAP_AMCNTRL, which indicative of a position for the throttle. The value indicated by TAP_AMCNTRL is transmitted by the EEC 10 in the form of throttle control signal 119 to control the position of throttle 102 via throttle actuator 120.

Referring back to modules 202.1 and 202.2, it can be seen that each of these modules receives three common values: BP, which is indicative of air pressure upstream of the throttle plate; MAP, which is indicative of air pressure downstream of the throttle plate; and ACT, which is indicative of the temperature of air entering the intake 101. The values BP and MAP are preferably generated by inferring the values as a function of the value AM and the rotational speed of the engine. These parameters could be measured using pressure sensors. As seen, value ACT is preferably generated as a function of air temperature signal 124 as generated by sensor 123.

Modules 202.1 and 202.2 differ in that module 202.1 receives the value DESMAF which is indicative of a desired airflow rate past the throttle 102 and module 202.2 receives the value AM which is indicative of the actual airflow rate past the throttle 102. Modules 202.1 and 202.2 each perform identical operations on the input signals to generate, respectively, the values TADES_pred and TAACT_pred. The value AM is generated as a function of air meter signal 118. The value DESMAF is generated by way of a table lookup utilizing different engine operating parameters depending upon the engine operating range. For instance, if the engine is operating in idle speed control mode, the value DESMAF is retrieved from a table indexed by engine temperature and the rotational speed of the engine. If the engine is operating in torque control mode the value DESMAF is retrieved from a table indexed by desired engine torque and the rotational speed of the engine.

Figure 3:
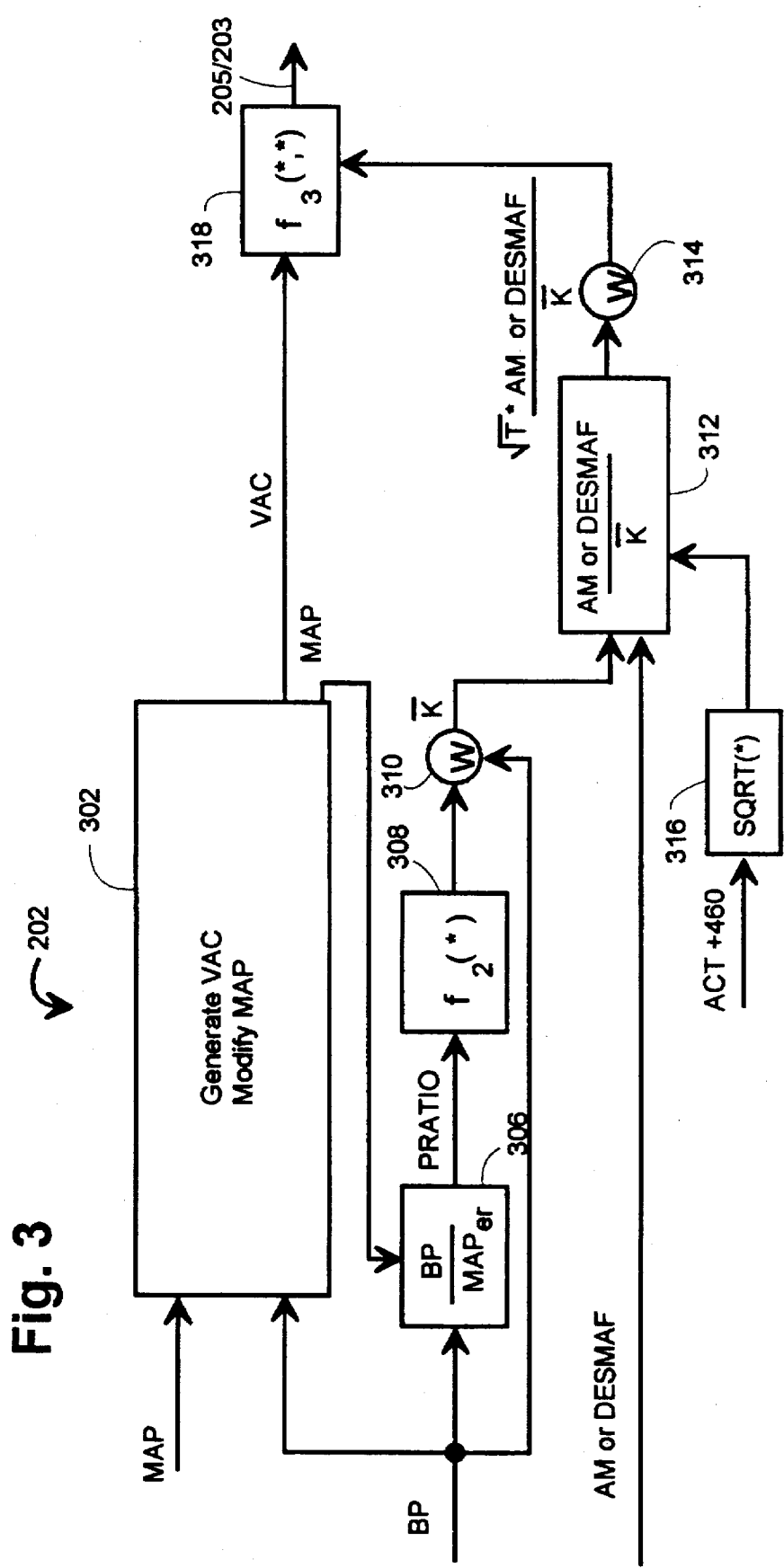
FIG. 3 is a block diagram illustrating in further detail, the operation of portions of FIG. 2.

As noted above, modules 202.1 and 202.2 perform identical functions. FIG. 3 of the drawings illustrates the operation of the modules 202.1 and 202.2 (collectively referred to as module 202) in greater detail. The module 202 implements the principles of an inverse throttle airflow rate model which advantageously generates a predicted throttle angle position based upon the inputs received by the module, thus providing compensation in the feedback loop for changes in the operating conditions of the engine. As seen in FIG. 3 at 302, the value MAP is used to generate a vacuum value, VAC, which is indicative of the air pressure differential across the throttle plate. Also at 302, the value MAP is corrected to if an out-of-range condition is detected. The functions performed at 302 are shown in greater detail below:

if (MAP>BP−0.1 then INF_MAP=BP−0.1     (1)

if (MAP<MIN) then INF_MAP=MIN     (2)

VAC=BP−MAP     (3)

if (MAP<=BP*CRIT) then VAC=BP*(1−CRIT)     (4)

In equation (1) above, the value MAP is compared to the value BP (minus a value of 0.1) and is set equal to (BP−0.1) if MAP is greater than that value. This operation is advantageously performed to clip MAF if an out-of-range condition is detected. In equation (2) above, the value MAP is clipped to a predetermined value, MIN, if it is less than that value. Preferably the predetermined value MIN is indicative of a minimum value of MAP exhibited by the particular engine. In equation (3) above, the value VAC is determined by taking the difference between BP and MAP, and in equation (4), the value VAC is clipped to a predetermined proportion of BP if the MAP value is less than or equal to a sonic or critical pressure ratio, CRIT. Preferably the value for CRIT is 0.5282818. The value VAC is used as an index to retrieve either the value TADES or TAACT from table 318, which is a two-dimensional table. The second index used with table 318 is generated by the combination of operations seen at 306–316.

The implementation of the inverse throttle airflow rate model seen in FIG. 3 advantageously utilizes only two-dimensional tables to implement a four input function, in order to reduce computational burdens on the EEC 10. At 306, the value MAP is used in conjunction with the value BP to generate a value PRATIO which is the ratio of BP to MAP. At 308, the value PRATIO is used as an index to a one-dimensional table, and the retrieved value is multiplied at 310 with the upstream pressure BP. The product, designated as $\overline{K}$ is then used as a divider to AM or DESMAF at 312, the result of which at 314 is multiplied by the square root of the value ACT. The product of the operation at 314 is then used as an index for the table at 318 to generate the throttle angle needed to satisfy the four inputs to the module 202.

It is to be understood that the specific mechanisms and techniques which have been described are merely illustrative of one application of the principles of the invention. For instance, the principles described above may be utilized to perform airflow rate control using an idle bypass valve rather than an electronic throttle. Numerous other modifications may be made to the methods and apparatus described without departing from the true spirit and scope of the invention.

What is claimed is:

1. Apparatus for controlling the airflow rate past a throttle plate of an engine, positioned in an intake of the engine, the apparatus comprising:

means, responsive to an actual airflow value, indicative of the mass flow rate of air into said intake, and to a set of air intake values, indicative of a plurality of air intake characteristics, for generating an actual predicted throttle plate angle indicative of a first predicted position of said throttle plate;

means, responsive to a desired airflow value, indicative of a desired mass flow rate of air into said intake, and to said set of air intake values, for generating a desired predicted throttle plate angle indicative of a second predicted position of said throttle plate;

a controller, responsive to the difference between said actual predicted throttle plate angle and to said desired predicted throttle plate angle, for generating a throttle position change value;

means, responsive to said difference and to said desired predicted throttle plate angle, for generating a throttle angle control value indicative of a position of said throttle plate; and means, for causing change of said throttle to a position which corresponds to said throttle angle control value.

2. Apparatus as set forth in claim 1 wherein said first set of air intake values includes an upstream air pressure value, indicative of air pressure upstream of a throttle plate, a downstream air pressure value, indicative of air pressure downstream of said throttle plate, and an air temperature value, indicative of the temperature of said air entering said intake.

3. Apparatus as set forth in claim 2 wherein said controller is a proportional-integral-differential type controller.

4. Apparatus for controlling the airflow rate past a throttle plate of an engine, positioned in an intake of the engine, the apparatus comprising:

means for generating an upstream air pressure value, indicative of air pressure upstream of a throttle plate;

means for generating a downstream air pressure value, indicative of air pressure downstream of said throttle plate;

means for generating an actual air mass flow rate value, indicative of the actual mass flow rate of air into said intake;

means for generating an air temperature value, indicative of the temperature of said air entering said intake;

means, responsive to said upstream air pressure value, said downstream air pressure value, said air temperature value and a desired air mass flow rate value, indicative of desired airflow past said throttle plate, for generating a predicted desired throttle angle value;

means, responsive to said upstream air pressure value, said downstream air pressure value, said air temperature value and said actual air mass value, for generating a predicted actual throttle angle value;

means, responsive to said predicted desired throttle angle value and to said predicted actual throttle angle value, for generating a throttle angle difference value;

means, responsive to said throttle angle difference value, for generating a throttle angle change value;

means, responsive to said throttle angle change value and to said predicted desired throttle angle value for generating a throttle angle control value, indicative of a position for said throttle; and means, for causing change of said throttle to a position which corresponds to said throttle angle control value.

5. The invention as set forth in claim 4 wherein the means for generating a throttle angle change value comprises a proportional-integral-difference controller.

6. The invention as set forth in claim 5 wherein the throttle is an electronically controlled throttle.

7. The invention as set forth in claim 6 wherein the means for generating an upstream air pressure value infers said upstream air pressure value as a function of the rotational speed of said engine and said actual air mass value.

8. The invention as set forth in claim 7 wherein the means for generating an downstream air pressure value infers said downstream air pressure value as a function of the rotational speed of said engine and said actual air mass flow rate value.

9. The invention as set forth in claim 6 wherein the means for generating an upstream air pressure value comprises a pressure sensor.

10. The invention as set forth in claim 8 wherein the means for generating a downstream air pressure value comprises a pressure sensor.

11. An article of manufacture comprising:

a computer storage medium having a computer program encoded therein for causing a computer to control a throttle angle of an electronically controlled throttle, said computer storage medium comprising:

means for causing a computer to generate an upstream air pressure value, indicative of air pressure upstream of said throttle;

means for causing a computer to generate a downstream air pressure value, indicative of air pressure downstream of said throttle;

means for causing a computer to generate an actual air mass value, indicative of the actual mass flow rate of air into said intake;

means for causing a computer to generate an air temperature value, indicative of the temperature of said air entering said intake;

means for causing a computer to generate, as a function of said upstream air pressure value, said downstream air pressure value, said air temperature value and a desired airflow value, indicative of desired airflow past said throttle plate, a predicted desired throttle angle value;

means for causing a computer to generate, as a function of said upstream air pressure value, said downstream air pressure value, said air temperature value and said actual air mass value, a predicted actual throttle angle value;

means for causing a computer to generate, as a function of said predicted desired throttle angle value and said predicted actual throttle angle value, a throttle angle difference value;

means for causing a computer to generate as a function of said throttle angle difference value, a throttle angle change value; and means for causing a computer to generate, as a function of said throttle angle change value and said predicted desired throttle angle value, a throttle angle control value, indicative of a position for said throttle; and means for causing a computer to transmit a throttle control signal to change said throttle to a position which corresponds to said throttle angle control value.

\* \* \* \* \*